No. 38,695. PATENTED MAY 26, 1863.
D. S. OGDEN.
MEANS FOR MAKING CEMENT PIPES, &c.
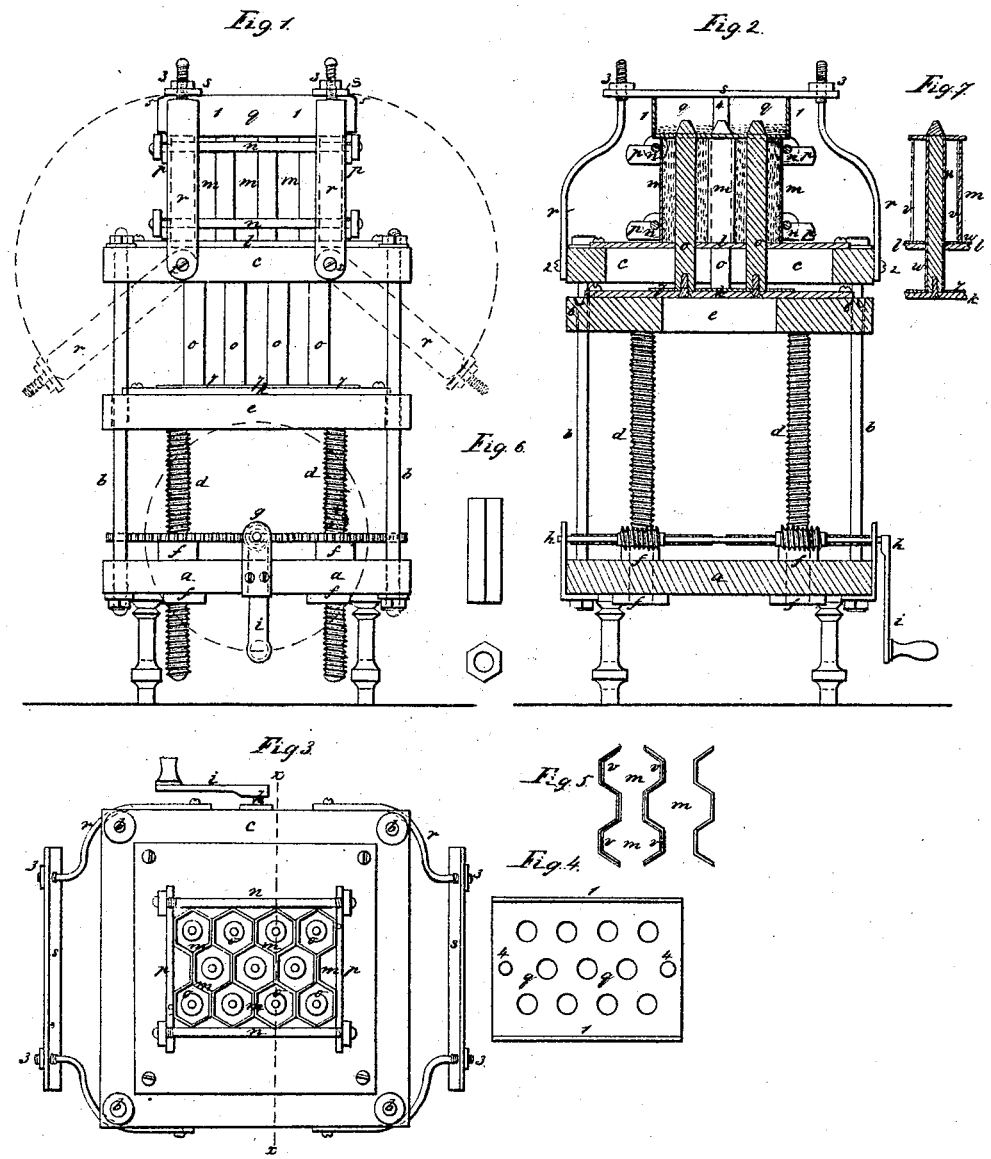

UNITED STATES PATENT OFFICE.

DAVID S. OGDEN, OF NEW YORK, N. Y.

IMPROVEMENT IN MEANS FOR MAKING GEMENT PIPES, &c.

Specification forming part of Letters Patent No. 38,695, dated May 26, 1863; antedated February 23, 1863.

*To all whom it may concern:*

Be it known that I, DAVID S. OGDEN, of the city and State of New York, have invented, made, and applied to use a certain new and useful Improvement in Means for Making Cement Pipes, &c.; and I do hereby declare that the following is a full, clear, and exact description of the said invention, reference being had to the annexed drawings, making part of this specification, wherein—

Figure 1 is a side elevation. Fig. 2 is a section at the line $x\ x$. Fig. 3 is a plan with the top hopper-plate removed, and Fig. 4 is a detached plan of said hopper-plate. Fig. 5 is a plan of some of the plates forming the mold detached, and Fig. 6 is an elevation and plan of one of the cement pipes.

Similar marks of reference denote the same parts.

Pipes have heretofore been formed of cement and clay for drains, and various kinds of machinery have been employed in their manufacture. The molds have been placed side by side, containing cores, and the clay or cement have been packed in with tamping-bars, and then the cores withdrawn and the molds separated. This operation, however, is tedious and costly, and the pipe that is made is apt to be more or less porous, not having received sufficient pressure.

The nature of my said invention consists in a series of molds formed by plates in an angular or zigzag shape, that when placed together make a series of hexagonal molds contiguous to each other, similar to the cells of a honeycomb. By this means the pipes are pressed in a small compass, and are easily removed from the molds by separating the said plates. I also employ cores that are forced in the molds after they are filled with cement, clay, or other material, and said cores are formed with a taper that produces a sufficient compression in the plastic mass to thoroughly consolidate the same, and to produce a compression on the material. Near the ends I employ a perforated hopper-plate, that also acts to hold the molds down to their place while the pipe is being made.

In the drawings, $a$ is a suitable platen connected by the tie rods $b$ to the upper bed-plate, $c$. $d\ d\ d\ d$ are right and left hand screws attached to the follower $e$ and $f f f f$ are nuts to said screws, formed each with a wheel and teeth acted upon by the screw-pinions $g\ g$ on the shaft $h$, which shaft is rotated by competent power applied to the crank $i$ or other device, so that by the rotation of said shaft $h$, and the nuts $f$, the screws $d\ d$ and follower $e$ are raised or lowered bodily with great accuracy, and any desired amount of power can be obtained to move said follower $e$. Upon the follower $e$ a plate, $k$, is attached, to which are connected by suitable means the cores $o\ o$, that are placed at uniform distances apart, as seen in Fig. 3, and said cores rise up through corresponding openings in the plate $l$, that is on the upper bed, $c$. The upper ends of these cores are tapered, and do not come to a sharp apex, but form a truncated cone.

$m\ m$ are the plates, that when set together form my molds. These plates are angular or zigzag, so that when placed together prismatic cells are formed, as seen in Fig. 3. These plates $m\ m$ are held together by tie-rods $n\ n$, extending from the cross-pieces $p\ p$ at the respective ends of the molds, and said tie-rods should be provided with nuts to bind the plates $m$ together more firmly. The plates forming the molds are so formed and held upon the bed $l$ by steady-pins or other means that the axis of the cores $o\ o$ coincide with the axis of the prismatic openings or cells of the molds.

$q$ is the hopper-plate, formed with sides 1 1, and held down upon the mold by the cross-bars $s\ s$ and slings $r\ r$, that are united at 2 2 by a bolt to the bed-plate $c$, and, if necessary, tie rods or straps might extend from these points 2 2 down to the platen $a$. The nuts 3 3 upon the ends of the slings $r\ r$ are employed to adjust the pressure of the bars $s\ s$ upon the hopper-plate $q$ and molds $m\ m$. Studs 4 4 may be employed on the plate $q$ to take beneath said cross-bars $s\ s$ to keep the plate from springing. This plate $q$ is perforated with holes corresponding in size, or nearly so, with the cores $o\ o$, and in such position as to receive the ends of said cores when they are raised up, as in Fig. 2.

The operation of this machine is as follows: The molds are to be put together and held firmly by the tie-rods $n\ n$ and placed on the bed-plate $l$, the cores $o\ o$ being depressed, as shown in Fig. 1. The molds are then to be filled by introducing clay or cement in a plastic state from any suitable reservoir, and said plastic mass should contain only as much water as is necessary to form a stiff mortar. The plate $q$ is then to be put on and held down by the straps $r\ r$ and cross-bars $s\ s$. The follower $e$ is then raised by the revolution of the nuts $f\ f\ f\ f$, forcing the cores $o\ o$ up through the clay or cement in the molds and forming the bore of the pipes. The tapering ends at the same time produce a compression in the plastic material that insures the required solidity. The hopper-plate $q$ holds down the plastic mass, and the compression produced by the tapering ends of the cores thoroughly fills all parts of the mold, and the cores passing up through the openings in said hopper-plate $q$ insures a perfect finish to the upper ends of the pipes. Any surplus material is carried out with the cores as they ascend and lodged in this hopper-plate $q$.

I have found practically that the shape of the end of the cores must be regulated according to the amount of compression required in the plastic mass and the relative size of the core and thickness of pipe. If the cores come to a sharp conical point, too much pressure will generally be produced in the plastic mass, and the molds be liable to injury. If said cores are too blunt at the ends, too much material will be carried out of the molds and too little pressure obtained. In cases where large pipes are being made the core should be longer, so that the plastic mass may run around the upper part of said cores, but this upper part should be of less diameter than the core itself, with an inclination or taper between the two diameters, whereby the compression will be produced by said inclined part acting as the core rises. After the pipes have been pressed the cores are to be drawn down, the hopper-plate $q$ removed by turning aside the slings $r\ r$, (see dotted lines, Fig. 1,) the edges of the said hopper-plate being inclined or cam-shaped, as at $5\ 5$, to allow this to be done easily. The molds are to be removed in a mass and another set of empty molds substituted and the operations repeated as before. When the pipes are sufficiently dry or set, the molds are to be taken apart and the pipes successfully removed and allowed to harden and dry in any usual manner. The pipes thus produced are of a hexagonal prismatic form; hence they will pack together closely for transportation. The cores might be prismatic, or the molds might be formed as semicircles in the respective plates $m$ to make round pipes.

The ends of the pipes may be finished off square, as shown, to set against each other, or they may be formed with conical ends by means of rings introduced in the molds around the cores on the plate $l$ and at the under side of the hopper-plate $q$. In cases where hubs are to be formed on the pipes, so that one may slip into the other, the molds are to be of a form adapted thereto, and the recess at the end of the pipe within the hub may be formed by a cylinder on the plate $l$ around the cores $o\ o$ or on the under side of the hopper plate $q$, the mold being adapted to form the exterior shape. The compression of the plastic mass is apt to force out considerable water and fine cement or clay, and this may be received in a trough around the follower $e$, as at 6, and conveyed away by a pipe.

In order to remove any concretion of cement that may accumulate between the base of the cores $o\ o$, I introduce a sheet, 7, that is formed of india-rubber or other suitable material and perforated to pass said cores. By lifting this sheet 7 off when the plate $l$ has been removed or the cores sufficiently lowered, the cement or other matter that may have accumulated is easily cleaned out entirely.

The plates $k$ and $l$ may be removed and others substituted, with cores adapted to different sizes of pipes.

With some kinds of material it is necessary to keep the mass in a confined state until partially dry or set. To effect this I employ a thin metallic tube, $u$, upon each core, as seen in Fig. 7, and this tube is left in the pipe as the core descends, and to support the lower end of the pipe I employ a sheet of metal, $w$, Fig. 7, similar to the sheet 7, that lifts off with the molds and pipes, and hence each pipe will be kept in the proper shape until partially dry or set, after which the tubes are drawn out and the molds separated. A number of these thin metal tubes $u$ are to be provided, so as to be placed upon the cores previous to each operation.

The molds $m$ may be of cast-iron, and will not require any finishing if plates of sheet-iron or other metal are employed as a lining for said plates $m$, as seen at $v\ v$ in Fig. 5, and the cast metal plates may be removed before the cement sets, which will allow the pipes to set or partially dry in the sheet-metal molds.

What I claim, and desire to secure by Letters Patent, is—

1. A series of hexagonal molds formed by the angular or zigzag plates $m\ m$, set together in the manner specified, so that the molds can be taken apart with facility for the removal of the pipe, as set forth.

2. A core set and moving on the line of the center of the mold for perforating the cement or material contained in said molds and forming pipe, as set forth.

3. A core provided with a taper or conical end to compress the material in the mold, in the manner set forth, as said core is forced through the mold, as and for the purposes specified.

4. A perforated hopper-plate, $q$, in combination with the molds $m$ and cores $o\ o$, substantially as and for the purposes set forth.

5. The movable tubes $u\ u$ on the cores $o\ o$, as and for the purposes specified.

6. The movable sheet-metal lining $v\ v$, in combination with the molds $m\ m$, for the purposes and as set forth.

7. The movable sheet $w$, of metal or other material, in combination with the molds $m\,m$, as and for the purposes set forth.

8. The movable sheet 7, of rubber or other suitable material, applied at the base of the cores $o\,o$, for the purposes and as specified.

9. The arrangement of the screws $d\,d\,d\,d$, nuts $f\,f\,f\,f$, and screw-pinions $g\,g$ on the shaft $h$, in combination with the follower $e$ and cores $o\,o$, as and for the purposes set forth.

10. The slings $r\,r$ and cross-bars $s\,s$, in combination with the hopper-plate $q$ and molds $m\,m$, as and for the purposes specified.

In witness whereof I have hereunto set my signature this 4th day of August, 1862.

DAVID S. OGDEN.

Witnesses:
LEMUEL W. SERRELL,
CHAS. H. SMITH.